United States Patent [19]

Hodshire

[11] 4,393,615
[45] Jul. 19, 1983

[54] FISHING APPARATUS

[76] Inventor: Vincent B. Hodshire, 2701 NE. Adams St., Peoria, Ill. 61603

[21] Appl. No.: 325,726

[22] Filed: Nov. 30, 1981

[51] Int. Cl.³ ............................................. A01K 97/01
[52] U.S. Cl. .................................................... 43/15
[58] Field of Search ............................... 43/15, 16, 17

[56] References Cited

U.S. PATENT DOCUMENTS

| | | | |
|---|---|---|---|
| 422,331 | 2/1890 | Bradford | 43/15 |
| 619,819 | 2/1899 | Zack | 43/15 |
| 2,744,351 | 5/1956 | Smith | 43/16 |
| 2,924,038 | 2/1960 | Dahlgren | 43/16 |
| 3,170,262 | 2/1965 | Hall | 43/15 |
| 3,174,247 | 3/1965 | Morgan | 43/15 |
| 3,271,891 | 9/1966 | Hancock | 43/15 |
| 3,474,561 | 10/1969 | McConkey | 43/16 |
| 3,798,821 | 3/1974 | Bybee | 43/15 |
| 4,321,767 | 3/1982 | Hodshire | 43/15 |

Primary Examiner—Nicholas P. Godici
Assistant Examiner—Kurt Rowan
Attorney, Agent, or Firm—James R. Bell

[57] ABSTRACT

Fish can lightly nibble bait off a hook before a fisherman becomes aware and is able to react by firmly setting the hook in the fish. Apparatus is provided for reacting to a fish lightly nibbling at the bait in a manner sufficient to swiftly jerk the hook thus firmly setting it in the fish. The apparatus can be used for ice fishing or can be hand held in the conventional manner for water fishing. The hook can be set for fishing at various depths.

9 Claims, 3 Drawing Figures

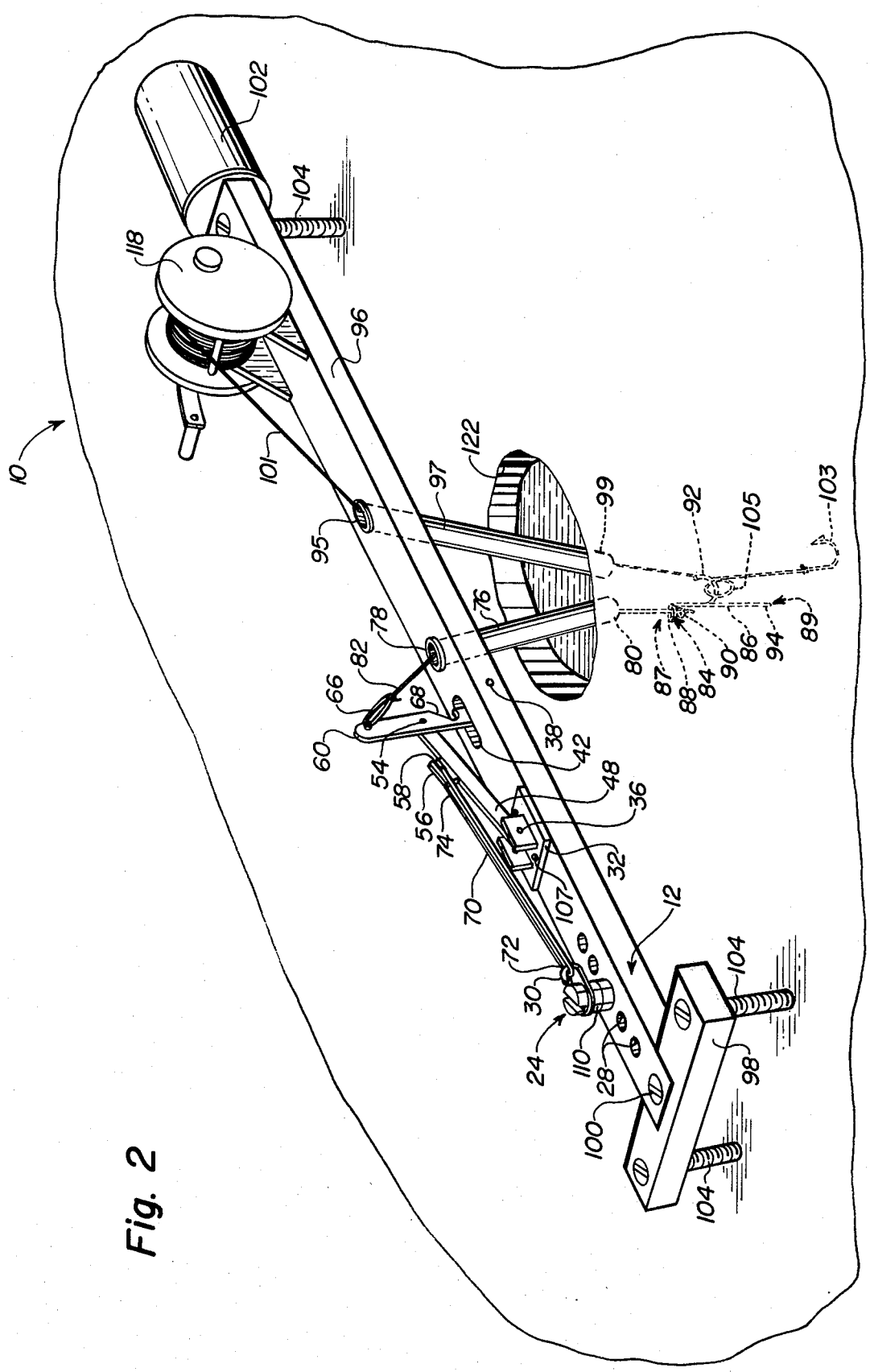

FISHING APPARATUS

BACKGROUND OF THE INVENTION

This invention relates generally to fishing and more particularly to automatic hookers or catchers.

Fishing apparatus of the type including spring loaded, presettable fish hook setting devices have limitations such as being expensive, complex, and somewhat unreliable. Also, in a desire to provide such an apparatus that is sensitive enough to be sprung or set off in response to a fish lightly nibbling at a baited hook, such devides are often tripped or set off prematurely. A further limitation of such devices is that they usually do not allow for setting the fish hook at various depths.

The foregoing illustrates limitations of the known prior art. Thus, it is apparent that it would be advantageous to provide an alternative directed to overcoming one or more of the limitations as set forth above. Accordingly, a suitable alternative is to provide a presettable, spring loaded, fish hooking apparatus that is inexpensive, reliable, non-complex, and allows for presetting the fish hook at various depths.

SUMMARY OF THE INVENTION

In one aspect of the present invention, this is accomplished by providing a fishing apparatus including a main support member having a first member connected to move between first and second positions. A trigger is connected to the first member and can be retained in the first position. A resilient member is connected for urging the trigger toward the second position. A pair of elongated guides are connected to extend from the main support and a reel is mounted on the main support. A first line is connected to the trigger and extends through one of the guides. A second line extends from the reel and through the other guide. Means are provided on the first line for releasably engaging the second line.

The foregoing and other aspects will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 2 is an isometric view illustrating an embodiment of the invention; and

DESCRIPTION OF THE PREFERRED EMBODIMENT

Figure 1:
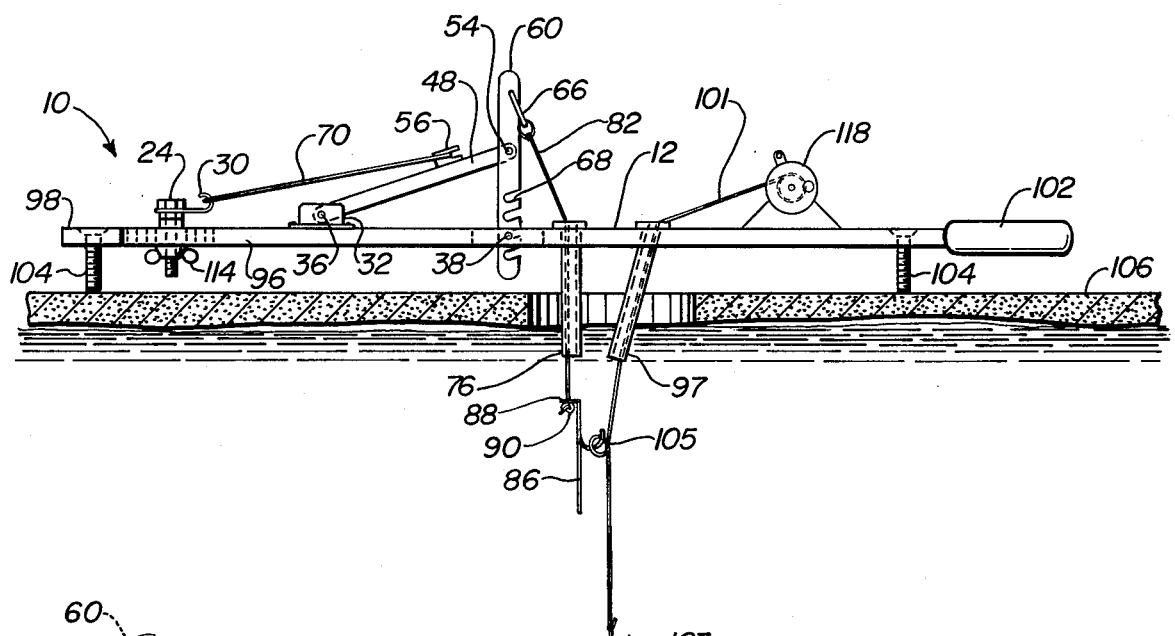
FIG. 1 is a graphic illustration of an embodiment of the present invention.

Fishing apparatus 10 includes a main support member 12 which is preferably formed of wood members 96, 98 joined in a "T" shape at bolt 100 and having a handle 102. Support legs such as bolts 104 extend through main support 12 for supporting apparatus 10 on an ice surface 106. In this manner, when apparatus 10 is to be used for water fishing, main support member 12 can be hand held at handle 102, and, when apparatus 10 is to be used for ice fishing, the apparatus is supported above ice surface 106 by legs 104.

A first member 48 is pivotally connected to member 12 at pivot pin 36 and plate 32 which is suitably attached to member 12 by wood screws 107, or the like. A plate 56 is suitably attached to member 48 and includes a slot 58.

Figure 3:
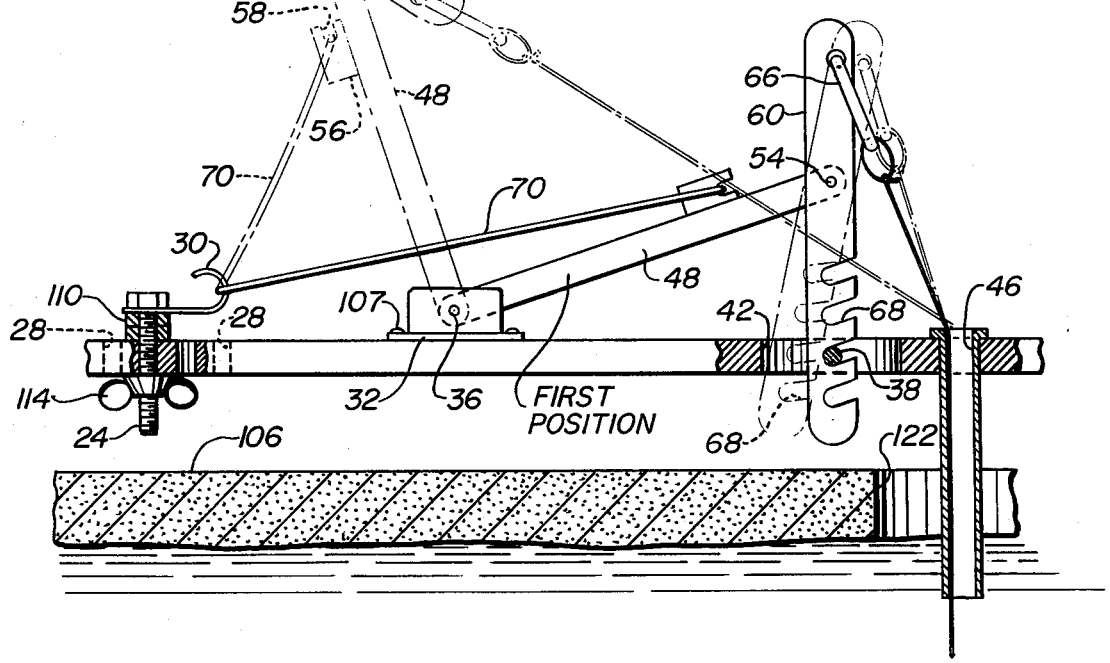
FIG. 3 is a partial cross-sectional side elevation of an embodiment of this invention.

A trigger 60 is pivotally connected to member 48 at a pivot pin 54 and may include a loop 66 and notches 68. A pin 38, attached to member 12 functions as a means for retaining member 48 and trigger 60 in a first (solid line) position as illustrated in FIG. 3. This is accomplished by inserting trigger 60 through an opening 42 in member 12 so that one of the notches 68 engages pin 38.

A bolt 24 is inserted through one of a plurality of holes 28 in member 12. Bolt 24 is thus adjustably mounted on member 12. For added adjustment, nuts 110 can be used to adjust the distance between a hook 30 and member 12. A wing nut 114 secures bolt 24 to member 12.

A resilient means such as a rubber band 70 includes a first end 72 engaged in hook 30, and a second end 74 engaged in slot 58. Resilient means 70 resiliently urges member 48 and trigger 60 from the first position to a second (dotted line) position as illustrated in FIG. 3.

A first elongated guide member 76 is connected to extend from main support 12. Guide member 76 is preferably a tubular member of a suitable material such as plastic or metal and has a first end 78 extending into support 12. Guide 76 terminates at a second end 80.

A first line 82, such as commonly available fishing line, is attached to trigger 60 at loop 66. If preferred, however, line 82 can be attached directly to trigger 60 and loop 66 can be omitted. Line 82 extends through guide 76 and terminates adjacent an end 84 of line 82.

A wire catch 86 is connected to end 84 of line 82. Catch 86 includes a loop portion 88 at a first end 87 that engages a knot 90 formed in end 84 of line 82. Catch 86 also extends from loop portion 88 to form a hook portion 92 and an extended portion 94 which terminates at a second end 89. Thus, hook portion 92 is between first end 87 and second end 89.

A second elongated guide member 97, preferably formed similar to first guide 76 and similarly attached to member 12, extends from support 12 and has a first end 95 adjacent a well-known fishing reel 118 also connected to support 12. Guide 97 terminates at a second end 99 adjacent second end 80 of guide 76.

A second line 101 is extendably connected to reel 118 and extends through guide 97 so as to be adjacent first line 82 and hook portion 92 of catch 86. Line 101 ultimately terminates at a fishing hook 103.

In this manner, an overhand loop 105 can be formed in line 101. The overhand loop 105 can be engaged with hook portion 92 of catch 86. Thus, hook portion 92 functions as a means connected to first line 82 for releasably engaging second line 101.

With the parts assembled as set forth above, it can be appreciated that with an overhand loop 105 formed in line 101 and loop 105 engaged with hook portion 92 of catch 86, and with trigger 60 set in the first or solid line position with one of the notches 68 engaged with pin 38, apparatus 10 is poised to jerk and set fishing hook 103 in a fish's mouth when first and second lines 82, 101, respectively, are moved a sufficient amount after a "strike" so that notch 68 disengages pin 38 and reslient means 70 pivotally snaps trigger 60 to the second or dotted line position. Since overhand loop 105 functions as a releasable engagement of line 101 and hook portion 92, line 101 easily releases from engagement with hook portion 92 in response to line 101 being retracted through guide 97 by actuation of reel 118. Legs 104 support apparatus 10 on ice surface 106 in a manner sufficient to permit members 76, 97 to extend through an opening 122 formed in ice surface 106.

The foregoing has described a presettable, spring loaded, fish hooking apparatus that is inexpensive, reliable, non-complex, and allows for presetting the fish hook at various depths.

It is anticipated that aspects of the present invention, other than those specifically defined in the appended claims, can be obtained from the foregoing description and the drawings.

Having thus described the invention, what is claimed is:

1. A fishing apparatus comprising:
 a main support member;
 a first member connected to said main support and movable between first and second positions;
 a trigger member connected to said first member;
 means for retaining said trigger and said first member in said first position;
 means for resiliently urging said trigger and said first member toward said second position;
 a first elongated guide member extending from said main support, said first guide having a first end adjacent said trigger;
 a first line connected to said trigger and extending through said first guide and terminating adjacent a second end of said guide;
 a reel mounted on said main support;
 a second elongated guide member extending from said main support, said second guide having a first end adjacent said reel;
 a second line extendably connected to said reel and extending through said second guide; and
 means connected to said first line for releasably engaging said second line.

2. The apparatus of claim 1 wherein said means for engaging said second line includes a catch member having a first end and a second end, said first end being connected to said first line and having a hook portion connected thereto between said first and second ends, whereby said second line can be formed to include an overhand loop for engagement with said hook portion.

3. The apparatus of claim 1 wherein said second line has a first end connected to said reel and extends through said second guide and terminates at a second end having a fish hook connected thereto.

4. The apparatus of claim 3 wherein said second line includes an overhand loop formed therein.

5. The apparatus of claim 4 wherein said means for engaging said second line includes an elongated member having a first end and a second end, said first end being connected to said first line and having a hook portion connected thereto between said first and second ends, said hook portion being of a construction sufficient for engaging said overhand loop of said second line.

6. The apparatus of claim 1 including:
 a plurality of legs connected to and extending from said main support member.

7. The apparatus of claim 1 including:
 a handle connected to said main support member adjacent said reel.

8. The apparatus of claim 1 wherein said main support member is generally "T" shaped and includes a plurality of legs connected thereto.

9. The apparatus of claim 8 including:
 a handle connected to said main support member adjacent said reel.

* * * * *